May 17, 1955

E. P. STARY 2,708,598

SPRINKLERS

Filed Feb. 11, 1952

INVENTOR.
Emil P. Stary

May 17, 1955

E. P. STARY 2,708,598

SPRINKLERS

Filed Feb. 11, 1952

INVENTOR.
Emil P. Stary

United States Patent Office 2,708,598
Patented May 17, 1955

2,708,598

SPRINKLERS

Emil P. Stary, El Monte, Calif., assignor to Walter E. Stary

Application February 11, 1952, Serial No. 270,926

6 Claims. (Cl. 299—69)

The invention relates to sprinklers for lawns, landscapes, golf courses, school grounds and for overhead irrigation systems for commercial gardens and fields.

An important object of this invention, is to provide a simple device of this character which will rotate, about a vertical axis in either direction and distribute the water, uniformly, over a circular area of maximum radius, from the water pressure available, in the form of a rain-like shower without the use of a spring for any part of the operation.

With the foregoing and other objects in view, which will appear as the description proceeds, the invention consists of certain novel details of construction and combination of parts, hereinafter more fully described and pointed out in the claims. It is understood that changes may be made in the construction and arrangement of parts without departing from the spirit of the invention as claimed. It is further understood that while the only liquid referred to in this specification is water, this new and improved sprinkler is also intended for use with any other liquid which may be similarly distributed over an area.

Referring to the drawings.

Figure 4, top plan.

Figure 5:
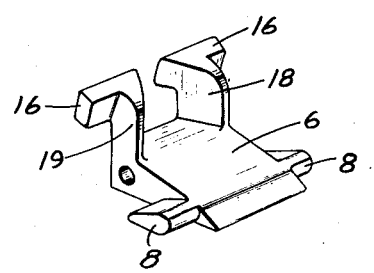

Figure 5, perspective of gate.

Figure 4:
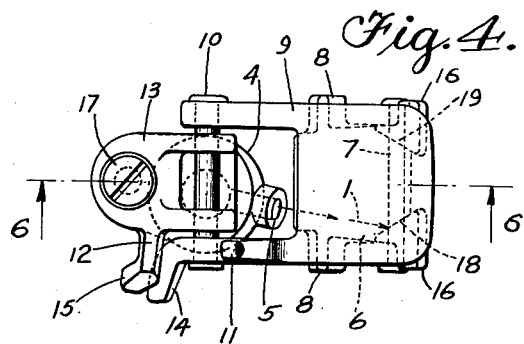
Figure 3:
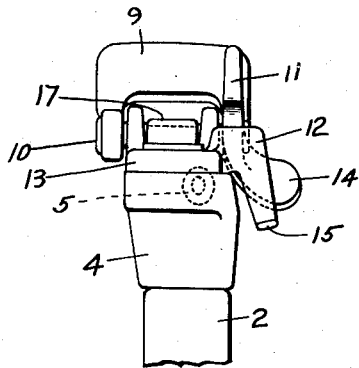
Figure 3 is a rear elevation.
Figures 6, 7:
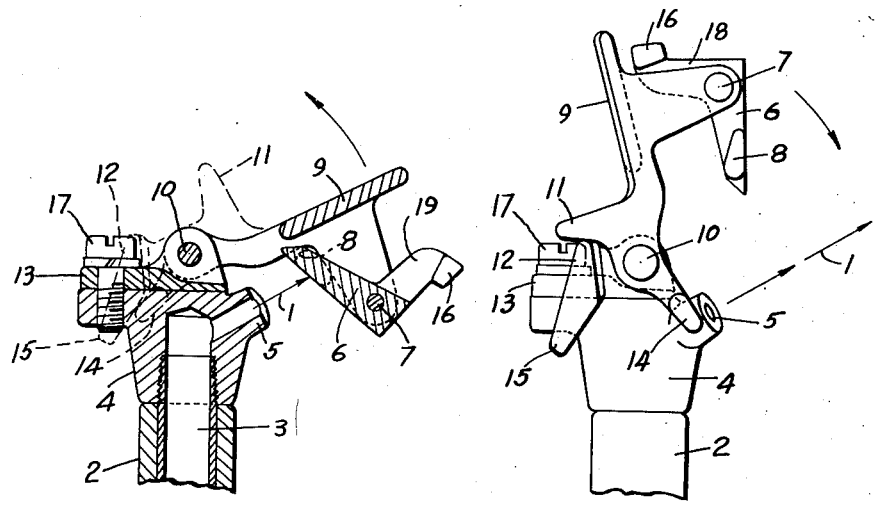

Figure 6, sectional elevation taken substantially on line 6—6 of Figure 4, but illustrating the gate in the next subsequent position.

Figure 1:
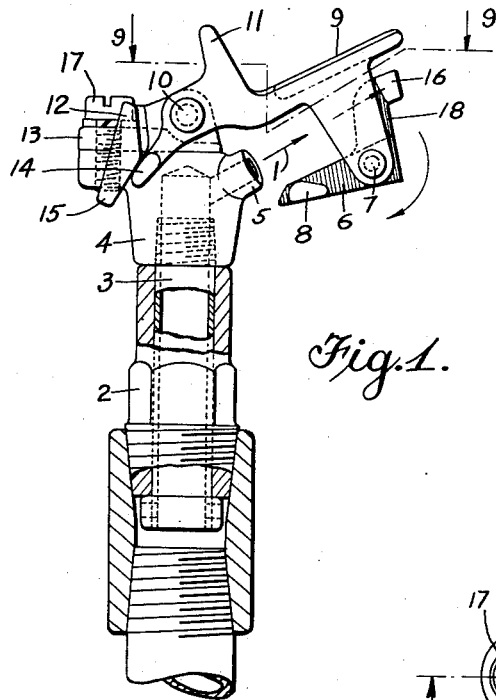
Figure 1 is a side elevation at start of cycle.
Figure 2:
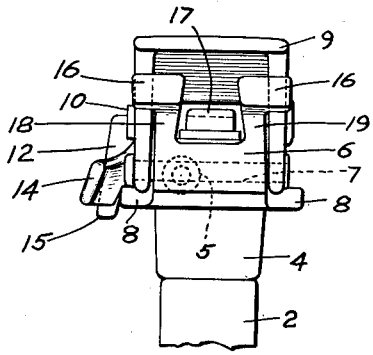
Figure 2 is a front elevation.

Figure 7, elevation similar to Figure 1, but certain elements in still another position.

Figures 8, 9:
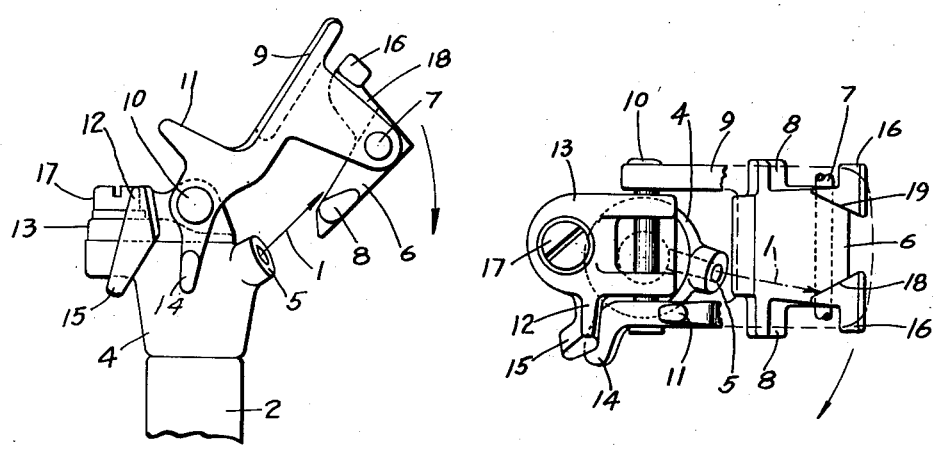

Figure 8 same as Figures 1 and 7, but still another position.

Figure 9, plan section, similar to Figure 4, illustrating the manner in which the sprinkler-head is rotated.

The sprinkler consists of a sprinkler-head 4 having an outlet or nozzle 5, pivot-member 3 attached to the sprinkler-head 4 and free to rotate through a casing 2 which is adapted to be attached to a water supply; directional-control member 13, having lugs 12 and 15 is secured to the sprinkler-head 4 by a screw 17; an arm 9 having lugs 11 and 14 is connected to control-member 13 by the pin 10; and a gate 6 having a wedge-shaped blade with substantially-normal projecting beveled sides 18 and 19, and lugs 8 and 16, is connected to a yoke-portion projecting from arm 9 by the pin 7. 1 represents the jet of liquid flowing from nozzle 5.

*Operation*

The water from the supply pipe flows through the pivot-member 3, the sprinkler-head 4, the nozzle 5, emerges as jet stream 1 and strikes the gate 6, as shown in Figure 1, forcing the gate 6 to turn on the pin 7. Lugs 8 on the gate 6 contact the yoke-portion of the arm 9 and limit the further rotating of gate 6 to that position shown in Figure 6. When gate 6 is in the position shown in Figure 6, jet stream 1, from the nozzle 5, strikes the bottom side of the wedge-shaped blade portion of gate 6 forcing the arm 9 with the gate 6 to swing, on the pin 10, upward above jet stream 1. Lug 11 on the arm 9 contacts the lug 12 on control-member 13 thus stopping arm 9 from swinging past center. The center of gravity of gate 6 is located in the wedge-shaped blade portion, of said gate, so that said gate, when in the position shown in Figure 6, is urged to rotate in a counter-clockwise direction by gravity. But said counter-clockwise rotation of gate 6 cannot occur so long as jet stream 1 strikes the bottom surface of said gate blade. After arm 9, carrying gate 6 in its Figure 6 position, swings upward to carry gas 6 out of jet stream 1, the gate 6 turns, in a counter-clockwise direction, on the pin 7 until lugs 16 contact the yoke-portion of arm 9, as shown in Figure 7. Arm 9 is stopped during its upward swinging movement, as heretofore described, before its center of gravity reaches a position vertically above the axis of pin 10, thus stopping arm 9 in an out-of-balance condition. Arm 9 with its contained gate 6 opened, as shown in Figure 7, then swings downward, the gate 6 enters the jet stream 1 and is forced downward, as shown in Figure 8 by said jet stream striking the top surface of the wedge-shaped blade portion of gate 6. Arm 9 continues to swing downward until lug 14, on said arm, contacts lug 15, on control-member 13, thus stopping arm 9 in the neutral position show in Figure 1. Directional-control member 13 is secured to the sprinkler-head 4 by the screw 17 in such a position as to cause jet stream 1 flowing from the nozzle 5 to strike the bevel side 18 of the gate 6, as shown in Figure 9, thus producing a horizontally-reacting force causing the sprinkler-head 4 to rotate slightly, through the casing 2, during the downward stroke of the arm 9 as gate 6 turns to the position shown in Figure 6, to thus start another cycle 4 operation of said sprinkler.

When the arm 9 and the gate 6 are above jet stream 1 flowing from the nozzle 5, in their upward stroke, as shown in Figure 7, there is nothing to retard or break-up said jet stream and the sprinkler delivers water a maximum distance from said sprinkler-head and said water falls in a rain-like pattern as said jet stream looses its velocity.

When arm 9 is moving downward to get from the Figure 7 to the Figure 1 position of said arm, said jet stream 1 strikes the top surface of said blade portion of gate 6 and is broken up and deflected upward to fall in an area closer to said sprinkler-head. At the same time, or immediately thereafter, part of the stream passing over the top surface of said blade strikes said horizontal-reaction surface 18, on said gate 6, and is deflected horizontally, as illustrated in Figure 9.

When said jet stream strikes the bottom side of said blade of gate 6, and as said gate with its containing arm 9, as shown in Figure 6, is being lifted by said jet stream, said jet stream is broken up and deflected downward to distribute water over the portion of the area nearest to said sprinkler-head.

Thus said water flowing from said sprinkler-head, as described above, is evenly distributed over a radial area between said sprinkler-head and the circumference of the area which is covered by the water pressure selected.

Directional-control member 13, to which the arm 9 is connected by the pin 10, is secured to the sprinkler-head 4 by the screw 17 in such a position as to cause said jet stream to strike the bevel side 18 of the gate 6, as shown in Figure 9, to thus force sprinkler-head 4 to rotate in a clockwise direction, or said control-member 13 may be turned on the sprinkler-head 4 and secured by the screw 17 in such a position as to cause said jet stream 1 to strike the opposite bevel side 19 of the gate 6 to thus force said sprinkler-head 4 to rotate in a counter-clockwise direction. Thus with this arrangement, the sprinkler-head may be made to rotate in either direction, clockwise or counter-clockwise.

I am aware that prior to my invention sprinklers have been made to rotate through a member or casing adapted to be attached to a water supply. I therefore do not claim such a combination broadly, but

I claim:

1. A sprinkling device, for distributing a liquid over an area, having a sprinkler-head mounted on a support so as to be rotatable about a substantially vertical axis, a sprinkler-nozzle in the head to direct the liquid jetting from said head in a stream horizontally, an arm mounted on said head so as to be oscillatable, in a substantially vertical plane, about an axis substantially normal to the axis of rotation of said head, and a gate pivotally mounted on said arm with said gate-pivot axis substantially parallel to the axis of oscillation of said arm, with said gate having a wedge-shaped blade providing vertical reaction surfaces, said surfaces being substantially parallel, in one direction, to said gate-pivot axis, and with said gate having a horizontal-reaction surface substantially normal to the mid-plane of said wedge-shaped blade and angularly related to said gate-pivot axis and to said arm-oscillation axis, wherein the liquid jetting from said sprinkler-nozzle acts intermittently and alternately on said gate vertical-reaction surfaces to produce force impulses causing said arm to oscillate vertically and wherein said liquid jet acts intermittently on said horizontal-reaction surface of said gate to produce horizontally-reacting force impulses which act tangentially relative to said axis of rotation of said head, said tangential force-reactions being transmitted to said head by means of said arm, to thus produce steps of rotation of said sprinkler-head.

2. A sprinkling device as in claim 1; wherein the downward portion of said vertical oscillating movement of said arm is started by the gravitational pull on said arm.

3. A sprinkling device as in claim 1; wherein a stop on said head limits the upward oscillating movement of said arm.

4. A sprinkling device as in claim 1; wherein a stop on said head limits the downward oscillating movement of said arm.

5. A sprinkling device as in claim 1; having opposing horizontal-reaction surfaces, on said gate, with selecting means so that the direction of said tangential force-reactions and the corresponding direction of rotation of said sprinkler-head may be selected.

6. A sprinkling device as in claim 1; having adjusting means whereby the position of said horizontal-reaction surface, horizontally-relative to said liquid jet, may be selected to thus select the magnitude of said horizontal-force reactions and the resulting magnitude of said steps of rotation of said head so as to obtain a desired preselected speed of rotation of said sprinkler-head.

References Cited in the file of this patent

UNITED STATES PATENTS

| | | |
|---|---|---|
| 2,228,720 | Coles | Jan. 14, 1941 |
| 2,345,030 | Buckner | Mar. 28, 1944 |